United States Patent
Mishiro et al.

(10) Patent No.: US 11,644,706 B2
(45) Date of Patent: May 9, 2023

(54) GLASS PLATE

(71) Applicant: AGC INC., Chiyoda-ku (JP)

(72) Inventors: Hitoshi Mishiro, Tokyo (JP); Takehiko Nose, Tokyo (JP); Minoru Tamada, Tokyo (JP); Yohei Kawai, Tokyo (JP); Naoya Wada, Tokyo (JP)

(73) Assignee: AGC INC., Chiyoda-ku (JP)

( * ) Notice: Subject to any disclaimer, the term of this patent is extended or adjusted under 35 U.S.C. 154(b) by 485 days.

(21) Appl. No.: 16/718,633

(22) Filed: Dec. 18, 2019

(65) Prior Publication Data

US 2020/0124908 A1 Apr. 23, 2020

Related U.S. Application Data

(63) Continuation of application No. PCT/JP2018/023264, filed on Jun. 19, 2018.

(30) Foreign Application Priority Data

Jun. 20, 2017 (JP) .............................. JP2017-120170

(51) Int. Cl.
| | |
|---|---|
| *G02F 1/1335* | (2006.01) |
| *G02F 1/1333* | (2006.01) |
| *C03C 15/00* | (2006.01) |
| *C03C 17/30* | (2006.01) |

(52) U.S. Cl.
CPC ........ *G02F 1/133502* (2013.01); *C03C 15/00* (2013.01); *C03C 17/30* (2013.01); *G02F 1/133308* (2013.01); *G02F 1/133331* (2021.01)

(58) Field of Classification Search
None
See application file for complete search history.

(56) References Cited

U.S. PATENT DOCUMENTS

| | | | |
|---|---|---|---|
| 8,003,194 B2 | 8/2011 | Richter et al. | |
| 2015/0369969 A1* | 12/2015 | Hoshino | C09D 163/00 427/164 |
| 2016/0313494 A1* | 10/2016 | Hamilton | G02B 5/0221 |
| 2017/0276995 A1* | 9/2017 | Sato | B24C 1/00 |
| 2017/0285227 A1* | 10/2017 | Chen | G02B 1/12 |
| 2020/0124772 A1* | 4/2020 | Nakata | B32B 27/30 |

FOREIGN PATENT DOCUMENTS

| | | |
|---|---|---|
| CN | 104955783 A | 9/2015 |
| TW | 201434775 A | 9/2014 |
| WO | WO 2014/119453 A1 | 8/2014 |
| WO | WO 2015/095288 A2 | 6/2015 |

OTHER PUBLICATIONS

International Search Report dated Sep. 18, 2018 in PCT/JP2018/023264 filed Jun. 19, 2018 (with English Translation), 5 pages.

* cited by examiner

*Primary Examiner* — Phu Vu (74) *Attorney, Agent, or Firm* — Oblon, McClelland, Maier & Neustadt, L.L.P.

(57) ABSTRACT

The present invention relates to a glass plate which is provided with a first main surface, and a second main surface which faces the first main surface. An antiglare portion and a non-antiglare portion are provided to the first main surface. The average lengths (RSm) of elements of roughness curves of the antiglare portion and the non-antiglare portion are respectively 1 μm or higher. The difference between the RSm of the antiglare portion and the RSm of the non-antiglare portion is 100 μm or lower.

14 Claims, 3 Drawing Sheets

GLASS PLATE

TECHNICAL FIELD

The present invention relates to a glass plate.

BACKGROUND ART

In recent years, a cover composed of glass is provided, for example, on the display surface side of a display device such as LCD (Liquid Crystal Display) device so as to protect the display device. However, in the case where such a glass plate is provided on the display device, reflection of things placed therearound may often occur when visually recognizing a display image through the glass plate. Occurrence of such reflection on the glass plate not only makes it difficult for a viewer of the display image to visually recognize the display image but also gives an unpleasant impression to the viewer.

In order to prevent such reflection, for example, it is attempted to apply an antiglare treatment of forming an uneven shape on the glass plate surface.

As for the antiglare treatment, means of, for example, etching the glass plate surface (see, for example, Patent Literature 1) or forming a film having an uneven shape on the glass plate surface (see, for example, Patent Literature 2) are described.

As an LCD (Liquid Crystal Display) device, etc. becomes widespread, a new function is being required. For example, a system, etc. for monitoring the driver state with a camera to prevent dozing of a driver of an automobile, an electric train, etc. is sometimes mounted in an instrument panel, particularly, a cluster, etc. housing a meter, etc. provided in front of the driver. In this case, an antiglare treatment need not be applied to a portion corresponding to the camera view out of the glass plate serving as a cover.

In such a glass plate having a portion subjected to an antiglare treatment and a portion not subjected to the treatment, the presence of different portions on the glass plate gives rise to a problem of, for example, poor finger-touch feeling or deterioration of outer appearance due to a distinct border.

CITATION LIST

Patent Literature

Patent Literature 1: International Publication No. 2014/119453
Patent Literature 2: U.S. Pat. No. 8,003,194

SUMMARY OF INVENTION

Technical Problem

An object of the present invention is to provide a glass plate having an antiglare portion and a non-antiglare portion and being excellent in the feel to the touch and the outer appearance.

Solution to Problem

The glass plate according to one embodiment of the present invention has a first main surface and a second main surface opposing the first main surface, the first main surface having an antiglare portion and a non-antiglare portion, wherein each of the antiglare portion and the non-antiglare portion has an average length (RSm) of a roughness curve element of 1 μm or more, and a difference between RSm of the antiglare portion and RSm of the non-antiglare portion is 100 μm or less.

Advantageous Effects of Invention

According to the embodiment of the present invention, a glass plate having an antiglare portion and a non-antiglare portion and being excellent in the feel to the touch and the outer appearance can be provided.

DESCRIPTION OF EMBODIMENTS

The embodiments for carrying out the present invention are described below by referring to the drawings, but the present invention is not limited to the following embodiments, and various modifications and replacements can be made to the following embodiments without departing from the scope of the present invention.

In the present description, unless specified otherwise, the term AG means antiglare, and the term non-AG means non-antiglare.

Figure 1:
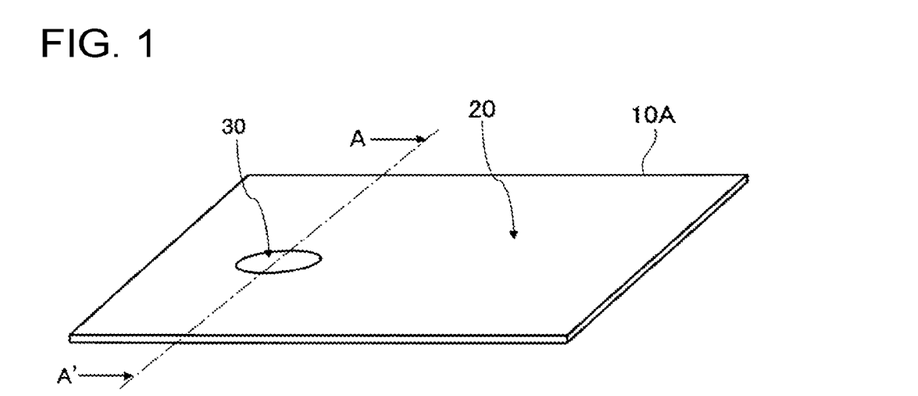
FIG. 1 is a perspective diagram schematically illustrating one aspect of the glass plate of an embodiment of the present invention.

The glass plate of this embodiment is described by referring to FIG. 1. FIG. 1 is a perspective diagram schematically illustrating the glass plate of this embodiment. In the glass plate 10A illustrated in FIG. 1, the top surface is a first main surface, and the bottom surface opposing the first main surface is a second main surface. The glass plate 10A of this embodiment has, in the first main surface, an antiglare (AG) portion 20 and a non-antiglare (non-AG) portion 30.

In the description of this application, a haze of transmitted light in the visible light region is used as an indicator of antiglare property. In the following, a haze referred to in the present description indicates a haze of transmitted light in the visible light region.

In the glass plate 10A of this embodiment, the haze is higher in the AG portion 20 than in the non-AG portion 30. The haze of the AG portion 20 is preferably 2% or more and 40% or less. When the haze is 2% or more, reflection of light can be significantly reduced by checking it with an eye, compared with a substrate not subjected to antiglare processing. If the haze exceeds 40%, diffused reflection of light occurs and in the case of using the glass plate as a cover member of a display device or as a substrate integrated with a touch panel, the display visibility of a display device may be reduced.

The haze of the AG portion 20 is more preferably 2% or more and 35% or less, still more preferably 3% or more and 30% or less.

On the other hand, the haze of the non-AG portion 30 is preferably 0.01% or more and less than 2%, more preferably 1% or less, still more preferably 0.5% or less. When the haze is less than 2%, an antiglare effect is not recognized, and the view is improved even if seen through the glass plate. In order to make the haze be less than 0.01%, thorough cleaning of the production process is necessary. When the haze is 0.01% or more, the production cost can be reduced.

The AG portion 20 can be formed by applying a surface treatment to the surface of the first main surface of the glass plate to form an uneven shape.

Figure 2:
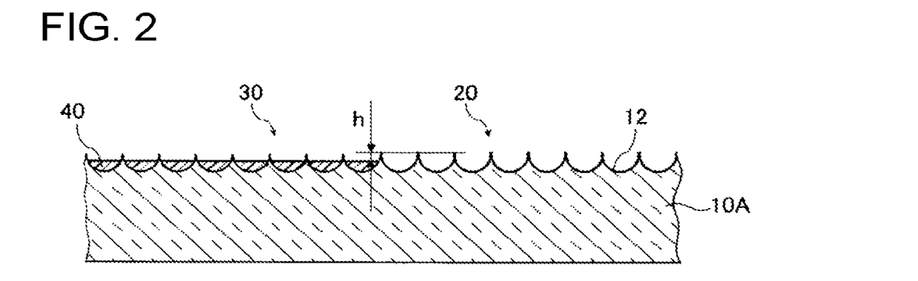
FIG. 2 is a cross-sectional diagram, cut along line A-A' in FIG. 1, of a region including an antiglare portion and a non-antiglare portion.

FIG. 2 is a cross-sectional diagram, cut along line A-A' in FIG. 1, of the AG portion 20 and the non-AG portion 30. Referring to FIG. 2, in the AG portion 20, an uneven shape is formed by the formation of a number of fine concave parts 12 on the first main surface. On the other hand, in the non-AG portion 30, a visible light-transmitting ink 40 is applied to the concave parts 12 while allowing a convex part serving as a boundary between concave parts to be slightly exposed from the surface.

In the glass plate of this embodiment, the non-AG portion 30 is not a flat surface and a convex part serving as a boundary between concave parts 12 is exposed from the first main surface. Thus, it is easy to form various functional films such as antifouling film and low-reflection film on the first main surface of the glass plate 10A. In addition, at the time of formation of various functional films, variation in optical properties is less likely to occur.

Furthermore, even when various functional films are not formed, the feel to the touch hardly differs between the AG portion 20 and the non-AG portion 30.

In the AG portion 20 illustrated in FIG. 2, the first main surface is made to have an uneven shape, for example, by forming a number of fine concave parts 12 in the first main surface of the glass plate 10A through physical or chemical surface treatment. The surface treatment conducted for the purpose above includes, for example, a method of subjecting the first main surface of the glass plate 10A to frost treatment. In the frost treatment, the first main surface of the glass plate 10A, i.e., the treatment target, is immersed, for example, in a mixed solution of hydrofluoric acid and ammonium fluoride or a mixed solution of hydrofluoric acid and potassium fluoride, and the immersed surface can thereby chemically surface-treated. Among others, the method of applying frost treatment of chemically surface-treating the surface by using a chemical solution such as hydrofluoric acid can be favorably utilized as a surface treatment method for forming a number of fine concave parts 12 on the first main surface of the glass plate 10A, because microcracks are hardly generated on the treated surface and reduction in the mechanical strength is unlikely caused.

In addition to such a method by chemical treatment, for example, a so-called sand blasting treatment of blowing a crystalline silicon dioxide powder, a silicon carbide powder, an aluminum oxide powder, etc. against the first main surface of the glass plate 10A under pressurized air, a so-called wet blasting treatment of dispersing a crystalline silicon dioxide powder, a silicon carbide powder, an aluminum oxide powder, etc. in water and blowing the dispersion against the first main surface of the glass plate 10A under pressurized air, and a physical surface treatment method of, for example, polishing the surface with a water-wetted brush to which a crystalline silicon dioxide powder, a silicon carbide powder, an aluminum oxide powder, etc. is adhered, can also be utilized as the surface treatment method for forming fine concave parts 12 on the first main surface of the glass plate 10A.

After a number of fine concave parts 12 are thus formed on the first main surface of the glass plate 10A, the first main surface of the glass plate 10A may be chemically etched so as to adjust the surface profile. In this case, the haze can be adjusted to a desired value by the etching amount, and cracks formed by sand blasting treatment, etc. can be eliminated. In addition, glaring can be reduced.

As for the etching, a method of immersing the glass plate, i.e., the treatment target, in a solution containing hydrofluoric acid as a main component is preferably used. The solution may contain hydrochloric acid, nitric acid, citric acid, etc. as the component other than hydrofluoric acid. By containing such a component, an alkali component contained in the glass can be prevented from reacting with hydrogen fluoride to locally cause a precipitation reaction and consequently, etching can be allowed to proceed evenly within the plane.

In FIG. 2, a number of concave parts 12 are formed on the first main surface of the glass plate 10A, and the first main surface is thereby made to have an uneven shape, but the glass plate of this embodiment is not limited thereto.

Figure 3:
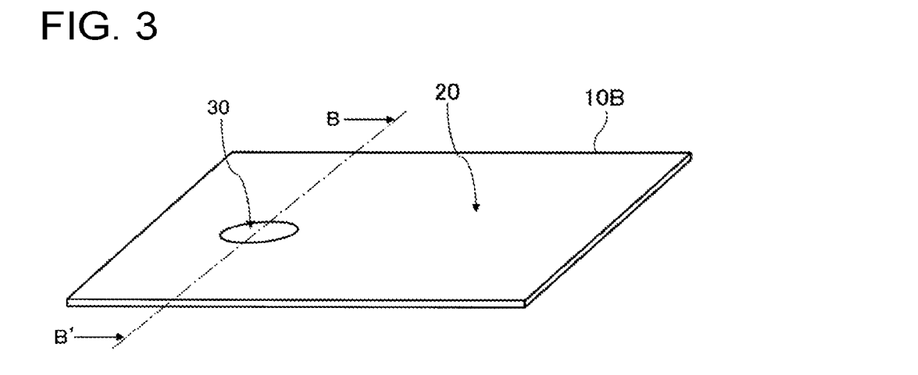
FIG. 3 is a perspective diagram schematically illustrating another aspect of the glass plate of an embodiment of the present invention.

FIG. 3 is a perspective diagram schematically illustrating the glass plate of another aspect of this embodiment. In the glass plate 10B illustrated in FIG. 3, the top surface is a first main surface, and the bottom surface opposing the first main surface is a second main surface. The glass plate 10B has, in the first main surface, an AG portion 20 and a non-AG portion 30. In FIG. 3, a number of fine convex parts 13 are formed on the first main surface of the glass plate 10B, and the hazes of the AG portion 20 and the non-AG prat 30 are the same as the ranges described for the glass plate 10A.

Figure 4:
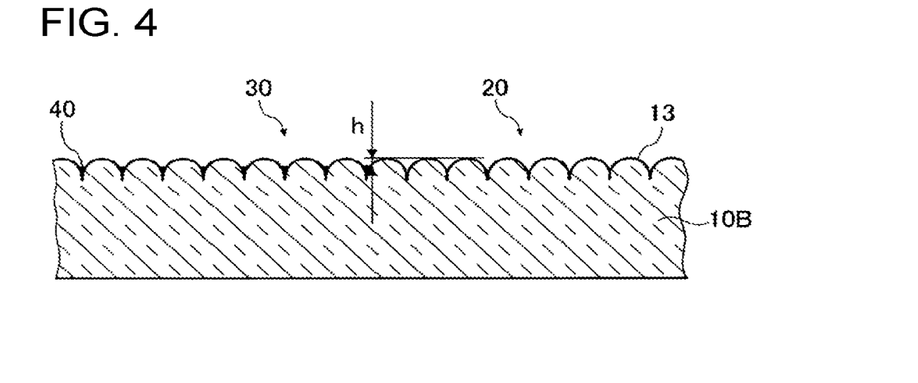
FIG. 4 is a cross-sectional diagram, cut along line B-B' in FIG. 3, of a region including an antiglare portion and a non-antiglare portion.

FIG. 4 is a cross-sectional diagram, cut along line B-B' in FIG. 3, of the AG portion 20 and the non-AG portion 30.

In the AG portion 20 illustrated in FIG. 4, the first main surface is made to have an uneven shape by forming a number of fine convex parts 13 on the first main surface of the glass plate 10B through surface treatment. The surface treatment conducted for the purpose above includes a method of coating the first main surface with a coating solution including fine particles containing silica as the main component. In the present description, containing silica as the main component means to contain 50 mass % or more, preferably 90 mass % or more, of $SiO_2$.

The fine particle containing silica as the main component may contain a small amount of components other than silica. Examples of this component include one or a plurality of ions selected from the group consisting of Li, B, C, N, F, Na, Mg, Al, P, S, K, Ca, Ti, V, Cr, Mn, Fe, Co, Ni, Cu, Zn, Ga, Sr, Y, Zr, Nb, Ru, Pd, Ag, In, Sn, Hf, Ta, W, Pt, Au, Bi, and lanthanide elements, and/or their compounds such as oxides.

In addition, the fine particle containing silica as the main component may be a solid particle or a hollow particle.

In the non-AG portion 30 illustrated in FIG. 4, a visible light-transmitting ink 40 is applied to the concave part 12 serving as the boundary between convex parts 13 provided on the first main surface of the glass plate 10B, while allowing the top of the convex part 13 to be slightly exposed from the first main surface. In FIG. 4, the ink 40 is depicted in black so as to facilitate discrimination from other constituent elements but is a visible light-transmitting ink.

Figure 5:
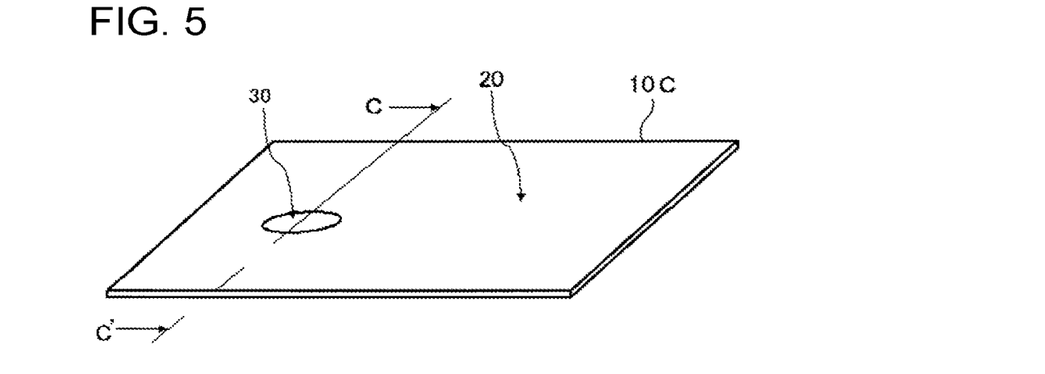
FIG. 5 is a perspective diagram schematically illustrating one aspect of the glass plate of another embodiment of the present invention.

FIG. 5 is a perspective diagram schematically illustrating the glass plate of another aspect of this embodiment. In the glass plate 10C illustrated in FIG. 5, the top surface is a first main surface, and the bottom surface opposing the first main surface is a second main surface. The glass plate 10C has, in the first main surface, an AG portion 20 and a non-AG portion 30. The hazes of the AG portion 20 and the non-AG prat 30 are the same as the ranges described for the glass plate 10A.

Figure 6:
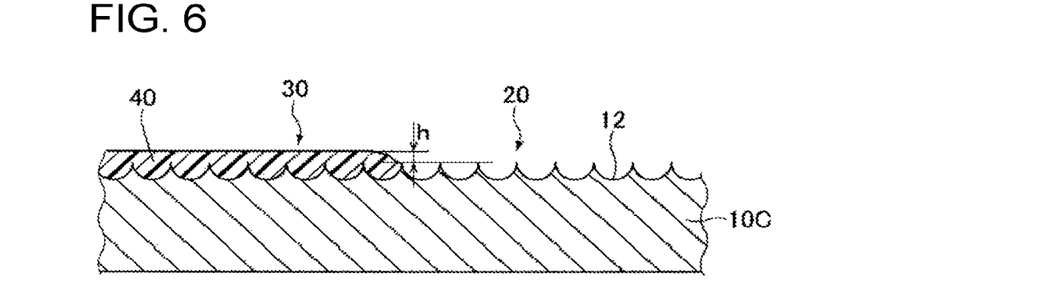
FIG. 6 is a cross-sectional diagram, cut along line C-C' in FIG. 5, of a region including an antiglare portion and a non-antiglare portion.

FIG. 6 is a cross-sectional diagram, cut along line C-C' in FIG. 5, of the AG portion 20 and the non-AG portion 30.

In the AG portion 20 of the glass plate 10C illustrated in FIG. 6, an uneven shape is formed on the first main surface of the glass plate 10C by the same method as the surface treatment applied to the glass plate 10A. On the other hand, in the non-AG portion 30 of this embodiment, a visible light-transmitting ink 40 covers the surface of the glass plate 10C over the entire region, and a convex part 13 serving as the boundary between concave parts 12 and being formed on the surface of the glass plate 10C is not exposed from the surface. In addition, although not illustrated, the non-AG portion 30 has some irregularities following the unevenness on the surface of the glass plate 10C.

In the glass plate of this embodiment, for the following reason, the entire region in the non-AG portion 30 is preferably covered with a visible light-transmitting ink 40. Compared with a case where only the concave part 12 on the glass plate 10C surface is coated with a visible light-transmitting ink, the film thickness of the visible light-transmitting ink can be made large, and the surface profile is easy to control. In particular, the average length (RSm) of the roughness curve element and the arithmetic average surface roughness (Ra) can be controlled to desired ranges. In addition, when the entire region of the non-AG portion 30 is covered with a visible light-transmitting ink 40, the surface reflectance can be made uniform. Thus, in the case of incorporating a camera in the non-AG portion, the brightness uniformity in the camera view can be enhanced.

Figure 7:
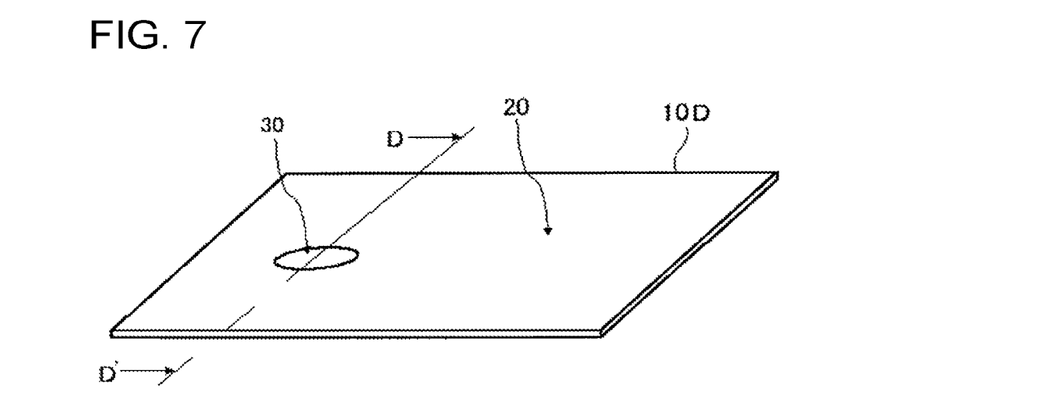
FIG. 7 is a perspective diagram schematically illustrating one aspect of the glass plate of another embodiment of the present invention.

FIG. 7 is a perspective diagram schematically illustrating the glass plate of another aspect of this embodiment. In the glass plate 10D illustrated in FIG. 7, the top surface is a first main surface, and the bottom surface opposing the first main surface is a second main surface. The glass plate 10D has, in the first main surface, an AG portion 20 and a non-AG portion 30. The hazes of the AG portion 20 and the non-AG prat 30 are the same as the ranges described for the glass plate 10A.

Figure 8:
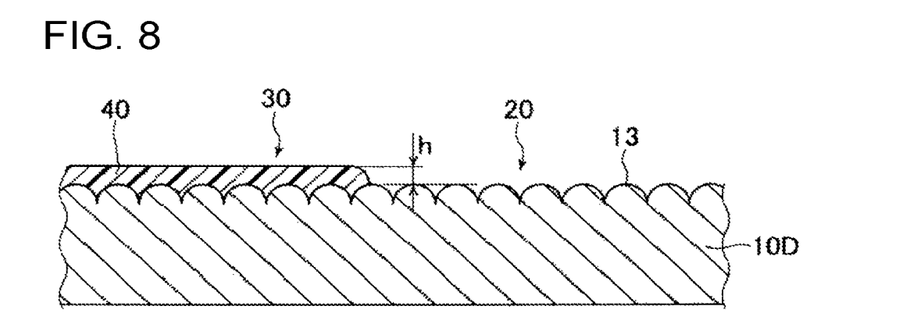
FIG. 8 is a cross-sectional diagram, cut along line D-D' in FIG. 7, of a region including an antiglare portion and a non-antiglare portion.

FIG. 8 is a cross-sectional diagram, cut along line D-D' in FIG. 7, of the AG portion 20 and the non-AG portion 30.

In the AG portion 20 of the glass plate 10D illustrated in FIG. 8, an uneven shape can be formed on the first main surface of the glass plate 10D by the same method as the surface treatment applied to the glass plate 10B. On the other hand, in the non-AG portion 30 of this embodiment, a visible light-transmitting ink 40 covers the surface of the glass plate 10D over the entire region, and a convex part 13 is not exposed from the surface. In addition, although not illustrated, the non-AG portion 30 has some irregularities following the unevenness on the surface of the glass plate 10D.

In the glass plate of this embodiment, for the following reason, the entire region in the non-AG portion 30 is preferably covered with a visible light-transmitting ink 40. Compared with a case where only the concave part 12 serving as the boundary between convex parts 13 is coated with a visible light-transmitting ink, the film thickness of the visible light-transmitting ink can be made large, and the surface profile is easy to control. In particular, the average length (RSm) of the roughness curve element and the arithmetic average surface roughness (Ra) can be controlled to desired ranges. In addition, when the entire region of the non-AG portion 30 is covered with a visible light-transmitting ink 40, the surface reflectance can be made uniform. Thus, in the case of incorporating a camera in the non-AG portion, the brightness uniformity in the camera view can be enhanced.

In the glass plates 10A, 10B, 10C and 10D, the ink applied to the first main surface of the glass plates 10A, 10B, 10C and 10D for the purpose of forming the non-AG portion 30 is not particularly limited as long as it is a visible light-transmitting ink. The ink may be of either inorganic type or organic type.

The ink of inorganic type may be, for example, a composition containing one or more selected from the group consisting of $SiO_2$, $ZnO$, $B_2O_3$, $Bi_2O_3$, $Li_2O$, $Na_2O$ and $K_2O$, one or more selected from the group consisting of $CuO$, $Al_2O_3$, $ZrO_2$, $SnO_2$ and $CeO_2$, $Fe_2O_3$, and $TiO_2$.

As the ink of organic type, various inks prepared by dissolving a resin in a solvent can be used. For example, as the resin, a resin such as acrylic resin, urethane resin, epoxy resin, polyester resin, polyamide resin, vinyl acetate resin, phenol resin, olefin resin, ethylene-vinyl acetate copolymer resin, polyvinyl acetal resin, natural rubber, styrene-butadiene copolymer, acrylonitrile-butadiene copolymer, polyester polyol, and polyether polyurethane polyether may be selected and used. The resins above are preferably transparent.

As the solvent of such an ink, water, alcohols, esters, ketones, aromatic hydrocarbon-based solvents, and aliphatic hydrocarbon-based solvents may be used. For example, as the alcohols, isopropyl alcohol, methanol, ethanol, etc. can be used; as the esters, ethyl acetate can be used; and as the ketones, methyl ethyl ketone can be used. In addition, as the aromatic hydrocarbon-based solvents, toluene, xylene, SOLVESSO 100, SOLVESSO 150, etc. can be used, and as the aliphatic hydrocarbon-based solvents, hexane, etc. can be used. These are recited as examples, and other various inks can be used.

These inks may contain a colorant such as pigment and dye as long as the visible light-transmitting property is not impaired, but it is preferable not to contain such a colorant.

The means for applying a visible light-transmitting ink to the first main surface of the glass plates 10A, 10B, 10C and 10D is not particularly limited, but it is preferable to print a visible light-transmitting ink on the first main surface. As the printing method, for example, spray printing or screen printing can be used.

In this embodiment, when attention is focused on the height in the thickness direction of the glass plate 10, the absolute value h of height difference between the AG portion 20 and the non-AG portion 30 in the thickness direction of the glass plates 10A, 10B, 10C and 10D is preferably 20 μm or less. In the present description, the absolute value h of height difference between the AG portion 20 and the non-AG portion 30 in the thickness direction of the glass plates 10A, 10B, 10C and 10D indicates the height difference between a location having a highest height in the AG portion 20 and a location having a lowest height in the non-AG portion 30. Based on the location having a highest height in the AG portion 20, the difference is calculated as a negative value when the location having a lowest height in the non-AG portion 30 is higher than the above-described location having a highest height, and calculated as a positive value when the location having a lowest height in the non-AG portion 30 is lower than the above-described location having a highest height. The absolute value thereof is taken as the absolute value h of height difference.

If the absolute value h of height difference exceeds 20 μm, the finger-touch feeling is not good, and the feel to the touch deteriorates. In addition, the outer appearance becomes poor due to a distinct boundary. On the other hand, when the absolute value h of height difference is 20 μm or less, despite having an AG portion 20 and a non-AG portion 30 in the first main surface, the feel to the touch and the outer appearance can be improved.

The absolute value h of height difference is preferably 10 μm or less, more preferably 8 μm or less, still more preferably 5 μm or less.

In order to stabilize the process of forming the non-AG portion, the absolute value h of height difference is preferably 0.1 μm or more, more preferably 0.5 μm or more, still more preferably 1 μm or more.

In the non-AG portion 30 of the glass plates 10A and 10B, a convex part 13 serving as the boundary between concave parts 12 is slightly exposed from the first main surface. In the non-AG portion 30 of the glass plates 10C and 10D, the entire region is covered with a visible light-transmitting ink 40. In either case, the absolute value h of height difference is more than 0 μm.

In this embodiment, for specifying the surface properties of the AG portion 20 and the non-AG portion 30, the average length (RSm) of the roughness curve element and the arithmetic average surface roughness (Ra) in these locations are used.

In this embodiment, RSm in each of the AG portion 20 and the non-AG portion 30 is 1 μm or more. More specifically, RSm measured for the AG portion 20 is 1 μm or more, and RSm measured for the non-AG portion 30 is 1 μm or more. The reason why RSm in each of the AG portion 20 and the non-AG portion 30 is preferably 1 μm or more is as described below.

If RSm is less than 1 μm, when the glass plate surface is touched with a finger, the contact of the finger with the glass plate surface is surface contact, and the resistance becomes large. As a result, the finger-touch feeling may be impaired. On the other hand, when RSm is 1 μm or more, the contact of the finger with the glass plate surface is point contact, and the resistance is less likely to be felt by a finger.

RSm of the AG portion 20 is more preferably 3 μm or more, still more preferably 5 μm or more. In addition, RSm of the AG portion 20 is preferably 40 μm or less, more preferably 30 μm or less, still more preferably 25 μm or less.

RSm of the non-AG portion 30 is more preferably 5 μm or more, still more preferably 10 μm or more. In addition, RSm of the non-AG portion 30 is preferably 150 μin or less, more preferably 100 μm or less, still more preferably 70 μm or less, yet still more preferably 60 μm or less.

In this embodiment, the difference between RSm in the AG portion 20 and RSm in the non-AG portion 30 is 100 μm or less.

The reason why the difference in RSm between both portions is preferably in the range above is as described below.

If the difference in RSm is more than 100 μm, light scattering significantly differs between the AG portion and the non-AG portion to allow for occurrence of a marked difference in terms of visual effects. As a result, the design of the glass plate may be impaired. When the difference in RSm is 100 μm or less, the difference in light scattering between the AG portion and the non-AG portion can be reduced. In addition, the difference in the feel to the touch between the AG portion and the non-AG portion can be reduced.

The difference in RSm between both portions is preferably 50 μm or less, more preferably 30 μm or less. The lower limit of the difference in RSm is preferably 1 μm or more.

The non-AG portion 30 is provided, in the case of using the glass plate of this embodiment as a cover glass of potable electronics, in a region provided on the front of a camera or a region for placing a fingerprint sensor, and in the case of using the glass plate as a protective member for other sensors, in a region through which visible light or radio wave for sensing transmits. Accordingly, in this embodiment, Ra of the non-AG portion 30 is preferably less than 100 nm because of no interfering with the camera function, fingerprint sensor function, etc. Ra of the non-AG portion 30 is more preferably less than 40 nm, still more preferably less than 20 nm, yet still more preferably less than 15 nm. In addition, Ra of the non-AG portion 30 is preferably 3 nm or more, more preferably 5 nm or more, still more preferably 7 nm or more.

On the other hand, Ra of the AG portion 20 is preferably 20 nm or more, more preferably 40 nm or more, still more preferably 100 nm or more. When Ra is 20 nm or more, the antiglare performance of the AG portion can be sufficiently exerted.

In this embodiment, the boundary between the AG portion 20 and the non-AG portion 30 is preferably a smooth line in view of outer appearance. According, the degree of contour of the non-AG portion 30 forming a boundary between the AG portion 20 and the non-AG portion 30 is preferably 0.5 mm or less, more preferably 0.3 mm or less, per 10 mm.

The degree of contour as used in the present description conforms to the degree of contour of JIS B-0621 (2001).

As described above, the non-AG portion 30 is provided, for example, in a region provided on the front of a camera, in a region for placing a fingerprint sensor, or in a region through which visible light or radio wave for sensing transmits, according to the use of the glass plate of this embodiment. For this reason, if the parallelism or flatness between the non-AG portion 30 and the second main surface is low, there arises a problem, for example, that the outer appearance of the glass plate 10 becomes poor or the optical properties of the non-AG portion 30 are deteriorated.

In this embodiment, the parallelism between the non-AG portion 30 and the second main surface is preferably 10 μm or less, more preferably 5 μm or less, still more preferably 2 μm or less, per 20 mm.

In order to stabilize the process of forming the non-AG portion, the parallelism between the non-AG portion 30 and the second main surface is preferably 0.1 μm or more, more preferably 0.5 μm or more, per 20 mm.

In this embodiment, the flatness between the non-AG portion 30 and the second main surface is preferably 10 μm or less, more preferably 5 μm or less, still more preferably 2 μm or less, per 20 mm.

In order to stabilize the process of forming the non-AG portion, the flatness between the non-AG portion 30 and the second main surface is preferably 0.1 μm or more, more preferably 0.5 μm or more, per 20 mm.

The parallelism and flatness as used in the present description conform to the parallelism and flatness of JIS B-0621 (2001).

As described above, the non-AG portion 30 in this embodiment is formed by applying a visible light-transmitting ink 40. Therefore, the non-AG portion 30 has good visible light-transmitting property. Specifically, the visible light transmittance of the non-AG portion 30 is preferably 88% or more, more preferably 90% or more, still more preferably 92% or more.

In this embodiment, various functional films may be formed on the first main surface of the glass plates 10A, 10B, 10C and 10D. An example of the functional film formed for this purpose is an antifouling film. The antifouling film can be formed, for example, by forming a coating of a fluorine-containing organic silicon compound on or above the first main surface of the glass plate. As the fluorine-containing organic silicon compound used for the formation of a coating, a compound capable of imparting antifouling property, water repellency or oil repellency can be used without any particular limitation. As a commercially available fluorine-containing organic silicon compound containing one or more selected from the group consisting of a polyfluoropolyether group, a polyfluoroalkylene group and a polyfluoroalkyl group, for example, KP-801 (trade name, produced by Shin-Etsu Chemical Co., Ltd.), KY-178 (trade name, produced by Shin-Etsu Chemical Co., Ltd.), KY-130 (trade name, produced by Shin-Etsu Chemical Co., Ltd.), KY-185 (trade name, produced by Shin-Etsu Chemical Co., Ltd.), OPTOOL (registered trademark) DSX and OPTOOL AES (both trade name, produced by Daikin Industries, Ltd.), S-550 (trade name, produced by AGC Inc.), etc. may be preferably used. The film thickness of the fluorine-containing organic silicon compound coating is not particularly limited but is preferably from 1 to 20 nm, more preferably from 2 to 10 nm.

The glass plates 10A, 10B, 10C and 10D of this embodiment have properties favorable for the formation of a fluorine-containing organic silicon compound coating.

If the absolute value h of height difference in the thickness direction between the AG portion 20 and the non-AG portion 30 is large, it is highly likely that aggregation of a fluorine-containing organic silicon compound occurs at the boundary between the AG portion 20 and the non-AG portion 30. If the fluorine-containing organic silicon compound is aggregated, hydrophobic groups of the fluorine-containing organic silicon compound are bonded to each other, and the function as an antifouling agent may be impaired. In addition, deterioration of the outer appearance due to aggregation of the fluorine-containing organic silicon compound is concerned.

In this embodiment, since the absolute value h of height difference between the AG portion 20 and the non-AG portion 30 in the thickness direction of the glass plates 10A, 10B, 10C and 10D is 20 μm or less, when a coating of the fluorine-containing organic silicon compound is formed on the first main surface of the glass plates 10A, 10B, 10C and 10D, aggregation of the fluorine-containing organic silicon compound is less likely to occur at the boundary between the AG portion 20. Thus, the non-AG portion 30, and the above-described problem is unlikely to be involved.

Another example of the functional film formed for the purpose above is a low reflection film. The material of the low reflection film is not particularly limited, and various materials can be used as long as it is a material capable of preventing reflection. For example, the low reflection film can be configured by stacking a high refractive index layer and a low refractive index layer.

The configuration may include one high refractive index layer and one low refractive index layer or may include two or more high refractive index layers and two or more low refractive index layers. In the case of including two or more high refractive index layers and two or more low refractive index layers, a configuration in which a high-refractive index layer and a low refractive index layer are alternately stacked is preferred.

In order to exhibit a sufficient antireflection performance, the low reflection film is preferably a laminate formed by stacking a plurality of films (layers). For example, in the laminate, a total of preferably two or more and six or less films, more preferably two or more and four or less films, are stacked. The laminate here is preferably a laminate in which, as described above, a high refractive index layer and a low-refractive index layer are stacked, and the total sum of the number of the high refractive index layers and the number of the low refractive index layers is preferably in the range above.

The materials of the high refractive index layer and the low refractive index layer are not particularly limited and can be selected taking into account the required degree of antireflection, productivity, etc. As the material constituting the high refractive index layer, for example, one or more selected from niobium oxide ($Nb_2O_5$), titanium oxide ($TiO_2$), zirconium oxide ($ZrO_2$), silicon nitride ($Si_3N_4$), and tantalum oxide ($Ta_2O_5$) may be preferably used. As the material constituting the low refractive index layer, silicon oxide ($SiO_2$) may be preferably used. As the high refractive index layer, among others, niobium oxide can be preferably used in view of productivity and degree of refractive index. Accordingly, the low reflection film is more preferably a laminate of a niobium oxide layer and a silicon oxide layer. The film thickness is preferably 40 nm or more and 500 nm or less, more preferably 100 nm or more and 300 nm or less.

Both a fluorine-containing organic silicon compound coating and a low reflection film may be formed on the first main surface of the glass plates 10A, 10B, 10C and 10D. In this case, a low reflection film and a fluorine-containing organic silicon compound coating are stacked in this order from the first main surface side.

EXAMPLES

The present invention is described below by referring to specific Examples but is not limited to these Examples. Examples 1 to 6 are Working Example of the invention, and Examples 7 to 11 are Comparative Example.

(1) Preparation of Sample

Example 1

The glass plate of this embodiment was manufactured by the following procedure.

In this Example, non-strengthened aluminosilicate glass (produced by AGC Inc., trade name: DRAGONTRAIL (registered trademark), size: 300 mm×300 mm, thickness: 1.3 mm) was used as the glass plate.

First, an acid-resistant protective film was laminated to the main surface where the AG portion was not to be formed, of the glass plate.

Subsequently, an antiglare treatment was performed by the following procedure to form an AG portion in the glass plate.

The glass plate was immersed in a 3 mass % hydrofluoric acid solution for 3 minutes to remove dirt adhering to the main surface not laminated with the protective film of the glass plate and at the same time, as a preprocessing, to remove a thickness of 10 μm of the glass plate. Furthermore, the glass plate was immersed in a mixed solution containing 8 mass % hydrofluoric acid and 8 mass % potassium fluoride for 3 minutes to perform a frost treatment on the main surface not laminated with the protective film of the glass plate and thereby form a number of fine concave parts in the main surface of the glass plate. The glass plate after the frost treatment was immersed in a 10 mass % hydrofluoric acid solution for 3 minutes (etching time: 4 minutes) to adjust the haze to 15%.

Thereafter, the protective film was peeled off, and the glass plate was immersed in a molten salt of potassium nitrate heated at 450° C. for 1 hour. The glass plate was then pulled up from the molten salt and gradually cooled to room temperature over 1 hour. A chemical strengthening treatment of the glass plate was thereby performed.

Next, the main surface subjected to the antiglare treatment of the glass plate was coated with one layer of a visible light-transmitting ink (produced by Seiko advance Ltd., trade name: HF-GV3 RX01-800 Medium) by a screen printing method using a screen printer to make a circular shape having φ 10 mm. After the coating with the visible light-transmitting ink, the ink was held at 150° C. for 30 minutes and thereby cured to form a non-AG portion in the main surface of the glass plate.

In the glass plate of Example 1, out of the main surface subjected to the antiglare treatment, the portion coated with the visible light-transmitting ink is a non-AG portion, and the portion other than the non-AG portion is an AG portion.

Example 2

A glass plate was obtained in the same manner as in Example 1 except for performing an antiglare treatment as follows.

The glass plate was immersed in a 3 mass % hydrofluoric acid solution for 3 minutes to remove dirt adhering to the main surface not laminated with the protective film of the glass plate and at the same time, as a preprocessing, to remove a thickness of 10 μm of the glass plate. Furthermore, the glass plate was immersed in a mixed solution containing 8 mass % hydrofluoric acid and 8 mass % potassium fluoride for 3 minutes to perform a frost treatment on the main surface not laminated with the protective film of the glass plate and thereby form a number of fine concave parts in the main surface of the glass plate. The glass plate after the frost treatment was immersed in a 10 mass % hydrofluoric acid solution for 2 minutes (etching time: 3 minutes) to adjust the haze to 25%.

Next, a non-AG portion was formed on the main surface of the glass plate in the same manner as in Example 1 except for coating the main surface with two layers of the visible light-transmitting ink by screen printing.

In the glass plate of Example 2, out of the main surface subjected to the antiglare treatment, the portion coated with the visible light-transmitting ink is a non-AG portion, and the portion other than the non-AG portion is an AG portion.

Example 3

A glass plate (produced by AGC Inc., trade name: DRAGONTRAIL (registered trademark), size: 300 mm×300 mm, thickness: 1.3 mm) chemically strengthened by the same method as in Example 1 was used. A spray antiglare treatment was conducted on this glass plate by the following procedure.

The surface of the glass plate was washed with aqueous sodium hydrogen carbonate, then rinsed with ion-exchanged water, and dried. Subsequently, the glass plate was heated in an oven such that the surface temperature reaches 80° C. Then the glass plate was coated with a hollow silica fine particle dispersion liquid by a spray method under the conditions of a spray pressure: 0.4 MPa, an amount of coating solution: 7 mL/min, a nozzle moving speed: 750 mm/min, a spray pitch: 22 mm, a distance from nozzle tip to glass plate: 115 mm, and a droplet diameter: 6.59 μm to form a number of fine convex parts in the main surface of the glass plate. The coating amount was adjusted to such an amount as to give a convex part height of 10 μm.

Next, the main surface subjected to the spray antiglare treatment of the glass plate was coated with a visible light-transmitting ink in the same manner as in Example 2, and the ink was cured to form a non-AG portion in the main surface of the glass plate.

In the glass plate of Example 3, out of the main surface subjected to the spray antiglare treatment, the portion coated with the visible light-transmitting ink is a non-AG portion, and the portion other than the non-AG portion is an AG portion.

Example 4

A glass plate was obtained in the same manner as in Example 3 except for changing the conditions of the spray antiglare treatment to the followings.

The surface of the glass plate was washed with aqueous sodium hydrogen carbonate, then rinsed with ion-exchanged water, and dried. Subsequently, the glass plate was heated in an oven such that the surface temperature reaches 80° C. Then, the glass plate was coated with a hollow silica fine particle dispersion liquid by a spray method under the conditions of a spray pressure: 0.4 MPa, an amount of coating solution: 7 mL/min, a nozzle moving speed: 500 mm/min, a spray pitch: 22 mm, a distance from nozzle tip to glass plate: 115 mm, and a droplet diameter: 6 μm to form a number of fine convex parts in the main surface of the glass plate. The coating amount was adjusted to such an amount as to give a convex part height of 10 μm.

A visible light-transmitting ink was applied in the same manner as in Example 3 and cured to form a non-AG portion in the main surface of the glass plate.

In the glass plate of Example 4, out of the main surface subjected to the spray antiglare treatment, the portion coated with the visible light-transmitting ink is a non-AG portion, and the portion other than the non-AG portion is an AG portion.

Example 5

In this Example, a non-strengthened glass plate (produced by AGC Inc., trade name: DRAGONTRAIL (registered trademark), size: 300 mm×300 mm, thickness: 1.3 mm) was used.

An antiglare treatment was applied to one main surface of the glass substrate as follows. First, a wet blasting treatment was conducted on the main surface where the AG portion was to be formed by using a wet blasting apparatus (manufactured by MACOHO Co., Ltd., apparatus name: W8MN-Q062 Jr. TypeII). White alumina particles (#2000) were used as the abrasive grain, and the pressure was set to 0.25 MPa. Subsequently, an acid-resistant protective film was laminated to the main surface where the AG portion was not to be formed, of the glass plate. Then, the glass plate was then immersed in a 10 mass % hydrofluoric acid solution and thereby etched to a target depth of 43 μm.

Thereafter, the protective film was peeled off, and the glass plate was immersed in a molten salt of potassium nitrate heated at 450° C. for 1 hour. The glass plate was then pulled up from the molten salt and gradually cooled to room temperature over 1 hour. A chemical strengthening treatment of the glass plate was thereby performed.

Next, the main surface subjected to the antiglare treatment of the glass plate was coated with one layer of a visible light-transmitting silicone-based ink by a screen printing method using a screen printer to make a circular shape having φ 10 mm. After the coating with the visible light-transmitting ink, the ink was held at 200° C. for 60 minutes and thereby cured to form a non-AG portion in the main surface of the glass plate.

In the glass plate of Example 5, out of the main surface subjected to the antiglare treatment, the portion coated with the visible light-transmitting ink is a non-AG portion, and the portion other than the non-AG portion is an AG portion.

Example 6

A glass plate was obtained in the same manner as in Example 5 except for performing the antiglare treatment as follows. First, a wet blasting treatment was conducted on the main surface where the AG portion was to be formed by using a wet blasting apparatus (manufactured by MACOHO Co., Ltd., apparatus name: W8MN-Q062 Jr. TypeII). White alumina particles (#1500) were used as the abrasive grain, and the pressure was set to 0.25 MPa. Subsequently, an acid-resistant protective film was laminated to the main surface where the AG portion was not to be formed, of the glass plate. The glass plate was then immersed in a 10 mass % hydrofluoric acid solution and thereby etched to a target depth of 38 μm.

Thereafter, a chemical strengthening treatment of the glass plate was performed in the same manner as in Example 5. A visible light-transmitting silicone-based ink was then applied and cured in the same manner as in Example 5 to form a non-AG portion in the main surface of the glass plate.

In the glass plate of Example 6, out of the main surface subjected to the antiglare treatment, the portion coated with the visible light-transmitting ink is a non-AG portion, and the portion other than the non-AG portion is an AG portion.

Example 7

An antiglare treatment and a chemical strengthening treatment were conducted by the same procedures as in Example 1 in the state where a protective film cut out into φ 20 mm was stuck as an acid-resistant protective film to a substantially central part of the main surface where the AG portion was to be formed, of the glass plate.

Subsequently, the glass plate was immersed in a 3 mass % hydrofluoric acid solution for 3 minutes to remove dirt adhering to the main surface not laminated with the protective film of the glass plate and at the same time, as a preprocessing, to remove a thickness of 10 μm of the glass plate. Furthermore, the glass plate was immersed in a mixed solution containing 8 mass % hydrofluoric acid and 8 mass % potassium fluoride for 3 minutes to perform a frost treatment on the main surface not laminated with the protective film of the glass plate. The glass plate after the frost treatment was immersed in a 10% hydrofluoric acid solution for 3 minutes (etching time: 4 minutes) to adjust the haze to 15%.

In the glass plate of Example 7, out of the main surface subjected to the antiglare treatment, the central part to which the protective film of φ 20 mm was stuck is a non-AG portion, and the portion other than the non-AG portion is an AG portion.

Example 8

After an antiglare treatment was conducted by the same procedure as in Example 1, a substantially central part of the surface subjected to the antiglare treatment was polished using a conically shaped grinding wheel of φ 5 mm and cerium oxide abrasive grains with a Knoop hardness of 3000 to remove the surface subjected to the antiglare treatment to a depth of 15 μm in the range of 20 mm. Thereafter, chemical strengthening was performed in the same manner as in Example 1.

In the glass plate of Example 8, out of the main surface subjected to the antiglare treatment, the portion in which polishing was performed is a non-AG portion, and the portion other than the non-AG portion is an AG portion.

Example 9

After an antiglare treatment was conducted by the same procedure as in Example 1, a protective film was stuck to the surface subjected to the antiglare treatment, excluding the range of φ 20 mm in the substantially central part of the surface, and tape polishing was performed using ceramic abrasive grains of #10000 to remove the surface subjected to the antiglare treatment to a depth of 12 μm. Thereafter, chemical strengthening was performed in the same manner as in Example 1.

In the glass plate of Example 9, out of the main surface subjected to the antiglare treatment, the central part of φ 20 mm to which the protective film was not stuck is an AG portion, and the portion other than the AG portion is a non-AG portion.

Example 10

A spray antiglare treatment and a chemical strengthening treatment were conducted by the same procedures as in Example 3 in the state where a protective film cut out into φ 20 mm was stuck as an acid-resistant protective film to a substantially central part of the main surface where the AG portion was to be formed, of the glass plate.

In the glass plate of Example 10, out of the main surface subjected to the spray antiglare treatment, the central part to which the protective film of φ 20 mm was stuck is a non-AG portion, and the portion other than the non-AG portion is an AG portion.

Example 11

After an antiglare treatment and a chemical strengthening treatment were conducted by the same procedures as in Example 1, a transparent film processed into a circular shape of φ 10 mm was stuck to the main surface subjected to the antiglare treatment of the glass plate to form a non-antiglare (AG) part.

In the glass plate of Example 11, out of the main surface subjected to the antiglare treatment of the glass plate, the portion to which the transparent film was stuck is a non-AG portion, and the portion other than the non-AG portion is an AG portion.

(2) Evaluation Methods

The methods for evaluating the properties of the glass plates manufactured in Examples 1 to 11 are described below.

(Measurement of Surface Profile)

With respect to the glass plates manufactured in Examples 1 to 11, the surface profile on the side having an AG portion and a non-AG portion was measured by a surface roughness·contour shape measuring device (manufactured by Tokyo Seimitsu Co., Ltd., trade name: SURFCOM) to obtain a planar profile. From the obtained planar profile, the absolute value h of height difference between the AG portion and the non-AG portion and Ra and RSm of each of the AG portion and the non-AG portion were determined based on JIS B 0601 (2001).

(Haze)

With respect to the glass plates manufactured in Examples 1 to 11, the transmission haze (%) in each of the AG portion and the non-AG portion was measured. The measurement of the haze was performed using a haze meter (manufactured by Suga Test Instruments Co., Ltd., trade name: HZ-V3).

(Degree of Contour)

With respect to the glass plates manufactured in Examples 1 to 11, the degree of contour of the non-AG portion was measured using a CNC image measuring system (manufactured by Nikon Instruments Inc., model: CNC Image Measuring System NEXIV VMR-10080).

(Parallelism)

With respect to the glass plates manufactured in Examples 1 to 11, the parallelism between the non-AG portion and the second main surface (the main surface opposing the main surface where an AG portion was formed) was measured using a laser microscope (manufactured by Keyence Corporation, trade name: Laser Displacement Sensor LK-GD500) with Cut Off: 0.8 to 8 mm.

(Flatness)

With respect to the glass plates manufactured in Examples 1 to 11, the flatness between the non-AG portion and the second main surface was measured using a surface roughness·contour shape measuring device (manufactured by Tokyo Seimitsu Co., Ltd., trade name: SURFCOM) under the conditions of Filter: 2RC, Cut Off: 0.8 to 8 mm, and Control length: 20 mm.

(Touch Feeling)

With respect to the glass plates manufactured in Examples 1 to 11, the touch feeling of the first main surface where an AG portion and a non-AG portion were formed was evaluated by an average value of scores on five-grade evaluation, 1: very good, 2: good, 3: no problem, 4: bad, and 5: very bad, by 10 persons.

(Visual Degree)

With respect to the glass plates manufactured in Examples 1 to 11, the visual degree when viewed through the non-AG portion was evaluated by an average value of scores on three-grade evaluation, A: good, B: slightly bad, and C: bad, by 10 persons.

(Fingerprint Wiping Test)

With respect to the glass plates manufactured in Examples 1 to 11, a fluorine-containing organic silicon compound was formed by the following procedure on the first main surface where an AG portion and a non-AG portion were formed.

First, a fluorine-containing organic silicon compound coating material (produced by Shin-Etsu Chemical Co., Ltd., trade name: KY-185) was introduced into a heating vessel. Thereafter, the solvent in the solution was removed by degassing the interior of the heating vessel with a vacuum pump for 10 hours or more to prepare a composition for the formation of a fluorine-containing organic silicon compound coating.

Next, the heating vessel containing the composition for the formation of a fluorine-containing organic silicon compound coating was heated up to 270° C. and after reaching 270° C., this state was maintained for 10 minutes until the temperature was stabilized. Then, deposition was performed by supplying the composition for the formation of a fluorine-containing organic silicon compound coating to the first main surface of the glass plate placed in a vacuum chamber through a nozzle connected to the heating vessel containing the composition for the formation of a fluorine-containing organic silicon compound coating.

At this time, deposition was performed while measuring the film thickness by a crystal oscillator monitor placed in the vacuum chamber, and the deposition was performed until the film thickness of the fluorine-containing organic silicon compound coating formed on the glass plate reached 10 nm. The supply of the raw material from the nozzle was stopped when the film thickness of the fluorine-containing organic silicon compound coating formed on the glass plate reached 10 nm, and the glass plate was then taken out from the vacuum chamber. The glass plate taken out was placed on a hotplate with the film surface turned up, and heat-treated at 150° C. for 60 minutes in the atmosphere.

Subsequently, the fingerprint wiping property was checked by the following procedure on the fluorine-containing organic silicon compound coating formed by the procedure above. A fingerprint was left on the step of each sample by using an artificial sweat under the same pressing force. Thereafter, a wiping test of checking the number of wipings until the fingerprint disappears was conducted using a gauze saturated with ethanol was conducted. The fingerprint wiping property was rated A when the fingerprint was wiped off within 10 wipings, rated B when wiped off by from 11 to 50 wipings, and rated C when not wiped off even by 50 wipings.

The evaluation results of Examples 1 to 11 are shown in the Tables below.

TABLE 1

| | Example 1 | Example 2 | Example 3 | Example 4 | Example 5 | Example 6 |
|---|---|---|---|---|---|---|
| AG Treatment method | frost | frost | spray AG | spray AG | wet blasting | wet blasting |
| Method for forming non-AG portion | printing | printing | printing | printing | printing | printing |
| Height difference h (μm) | 7 | 2 | 5 | 2 | 2 | 6 |
| Ra of AG portion (nm) | 150 | 120 | 220 | 240 | 240 | 350 |
| Ra of non-AG portion (nm) | 14 | 10 | 8 | 8 | 26 | 33 |
| RSm of AG portion (μm) | 8 | 7 | 8 | 12 | 34 | 27 |
| RSm of non-AG portion (μm) | 12 | 13 | 32 | 56 | 60 | 55 |
| Haze of AG portion (%) | 15 | 25 | 12 | 5 | 20 | 32 |
| Haze of non-AG portion (%) | 0.3 | 0.4 | 1.2 | 0.3 | 0.4 | 0.4 |
| Degree of contour (mm/10 mm) | 0.1 | 0.2 | 0.3 | 0.25 | 0.2 | 0.2 |

TABLE 1-continued

|  | Example 1 | Example 2 | Example 3 | Example 4 | Example 5 | Example 6 |
|---|---|---|---|---|---|---|
| Parallelism (μm/20 mm) | 0.8 | 0.7 | 1.3 | 0.2 | 1.5 | 1.9 |
| Flatness (μm/20 mm) | 0.5 | 0.3 | 1.2 | 1.5 | 1.3 | 1.6 |
| Touch feeling | 1 | 1 | 1 | 1 | 1 | 1 |
| Fingerprint wiping test | A | A | A | A | A | A |
| Visual degree | A | A | A | A | A | A |

TABLE 2

|  | Example 7 | Example 8 | Example 9 | Example 10 | Example 11 |
|---|---|---|---|---|---|
| AG Treatment method | frost | frost | frost | spray AG | frost |
| Method for forming non-AG portion | protective film | polishing with cylindrical grinding wheel | tape polishing | protective film | transparent tape |
| Height difference h (μm) | 30 | 15 | 12 | 15 | 50 |
| Ra of AG portion (nm) | 150 | 150 | 150 | 220 | 150 |
| Ra of non-AG portion (nm) | 0.2 | 42 | 55 | 0.3 | 0.5 |
| RSm of AG portion (μnm) | 8 | 8 | 7 | 11 | 8 |
| RSm of non-AG portion (μnm) | 0.01 or less | 180 | 220 | 0.01 or less | 0.01 or less |
| Haze of AG portion (%) | 15 | 15 | 15 | 12 | 15 |
| Haze of non-AG portion (%) | 0.1 | 1.5 | 1.2 | 0.1 | 0.1 |
| Degree of contour (mm/10 mm) | 1.8 | 0.3 | 0.5 | 0.8 | 0.3 |
| Parallelism (μm/20 mm) | 0.4 | 3.2 | 4.3 | 0.5 | 0.7 |
| Flatness (μm/20 mm) | 0.5 | 18.2 | 20.5 | 0.3 | 0.5 |
| Touch feeling | 4 | 4 | 4 | 4 | 4 |
| Fingerprint wiping test | B | B | B | B | B |
| Visual degree | A | B | B | B | B |

As seen from Tables 1 and 2, in Examples 1 to 6 where RSm of both the AG portion and the non-AG pare is 1 μm or more and the difference in RSm between the AG portion and the non-AG portion is 100 μm or less, the touch feeling, fingerprint wiping test and visual degree were good. On the other hand, in Examples 7, 10 and 11 where RSm of the non-AG portion is less than 1 μm, the touch feeling and the results of fingerprint wiping test were not good. In addition, in Examples 8 and 9 where although RSm of the non-AG portion is 1 μm or more, the difference in RSm between the AG portion and the non-AG portion is more than 100 μm, the touch feeling and the results of fingerprint wiping test were not good.

While the invention has been described in detail and with reference to specific embodiments thereof, it will be apparent to one skilled in the art that various changes and modifications can be made therein without departing from the spirit and scope of the invention.

This application is based on Japanese Patent Application No. 2017-120170 filed on Jun. 20, 2017, the contents of which are incorporated herein by way of reference.

REFERENCE SIGNS LIST

10A, 10B, 10C, 10D: Glass plate
12: Concave part
13: Convex part
20: Antiglare portion
30: Non-antiglare portion
40: Ink

The invention claimed is:

1. A glass plate having a first main surface and a second main surface opposing the first main surface, the first main surface having an antiglare portion and a non-antiglare portion, the antiglare portion being formed of an uneven shape which is formed in the first main surface itself, wherein:
    each of the antiglare portion and the non-antiglare portion has an average length (RSm) of a roughness curve element of 1 μm or more;
    a difference between RSm of the antiglare portion and RSm of the non-antiglare portion is 100 μm or less; and
    an absolute value of a height difference between the antiglare portion and the non-antiglare portion in a thickness direction of the glass plate is from 1 to 10 μm.

2. The glass plate according to claim 1, wherein:
    the antiglare portion has a haze of transmitted light in a visible light region of 2% or more and 40% or less; and
    the non-antiglare portion has a haze of transmitted light in a visible light region of less than 2%.

3. The glass plate according to claim 1, wherein the non-antiglare portion has an arithmetic average surface roughness (Ra) of less than 100 nm.

4. The glass plate according to claim 1, wherein the antiglare portion has an arithmetic average surface roughness (Ra) of 20 nm or more.

5. The glass plate according to claim 1, wherein the non-antiglare portion has a degree of contour of 0.5 mm or less per 10 mm.

6. The glass plate according to claim 1, wherein a parallelism between the non-antiglare portion and the second main surface is 10 μm or less per 20 mm.

7. The glass plate according to claim 1, wherein a flatness between the non-antiglare portion and the second main surface is 10 μm or less per 20 mm.

8. The glass plate according to claim 1, wherein the non-antiglare portion is formed by applying a visible light-transmitting ink.

9. The glass plate according to claim 1, wherein a fluorine-containing organic silicon compound coating is formed on or above the first main surface.

10. The glass plate according to claim 1, wherein a low reflection film and a fluorine-containing organic silicon compound coating are laminated in this order on the first main surface.

11. A production method for a glass plate, the method comprising:
   printing a visible light-transmitting ink on a part of the first main surface of a glass plate in which a first main surface has been subjected to an antiglare treatment, to form a non-antiglare portion,
   wherein the glass plate has the first main surface and a second main surface opposing the first main surface, the first main surface having an antiglare portion and the non-antiglare portion, the antiglare portion being formed of an uneven shape which is formed in the first main surface itself, wherein:
   each of the antiglare portion and the non-antiglare portion has an average length (RSm) of a roughness curve element of 1 μm or more;
   a difference between RSm of the antiglare portion and RSm of the non-antiglare portion is 100 μm or less; and
   an absolute value of a height difference between the antiglare portion and the non-antiglare portion in a thickness direction of the glass plate is from 1 to 10 μm.

12. The production method for a glass plate according to claim 11, wherein the ink contains a resin and does not contain pigment and/or dye.

13. The glass plate according to claim 1, wherein the antiglare portion is formed by directly forming an uneven shape in the first main surface of the glass plate.

14. The glass plate according to claim 1, wherein the absolute value of the difference between the antiglare portion and the non-antiglare portion in a thickness direction of the glass plate is from 2 to 10 μm.

* * * * *